April 24, 1934.         E. H. ELLISON         1,956,277
SCHOOLROOM WARDROBE
Filed March 19, 1930         8 Sheets-Sheet 2
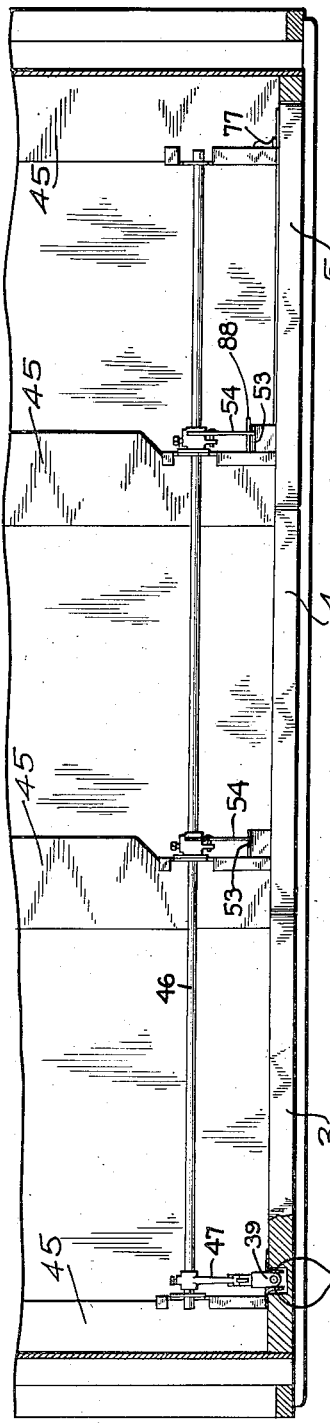
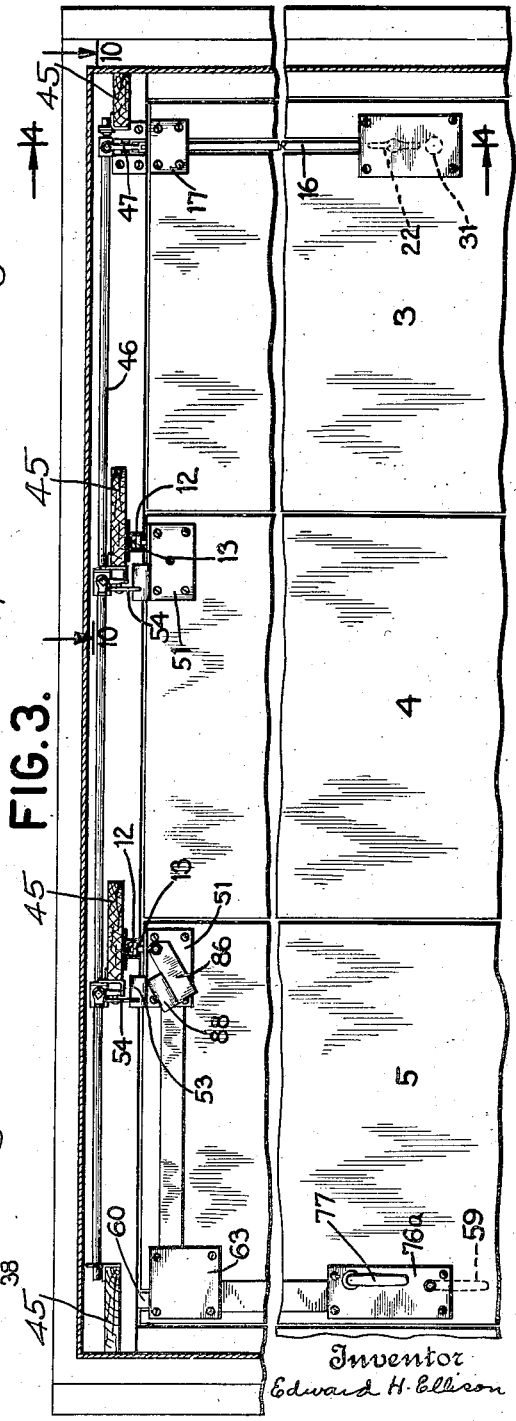
Inventor
Edward H. Ellison
By his Attorneys
Bohleber & Ledbetter

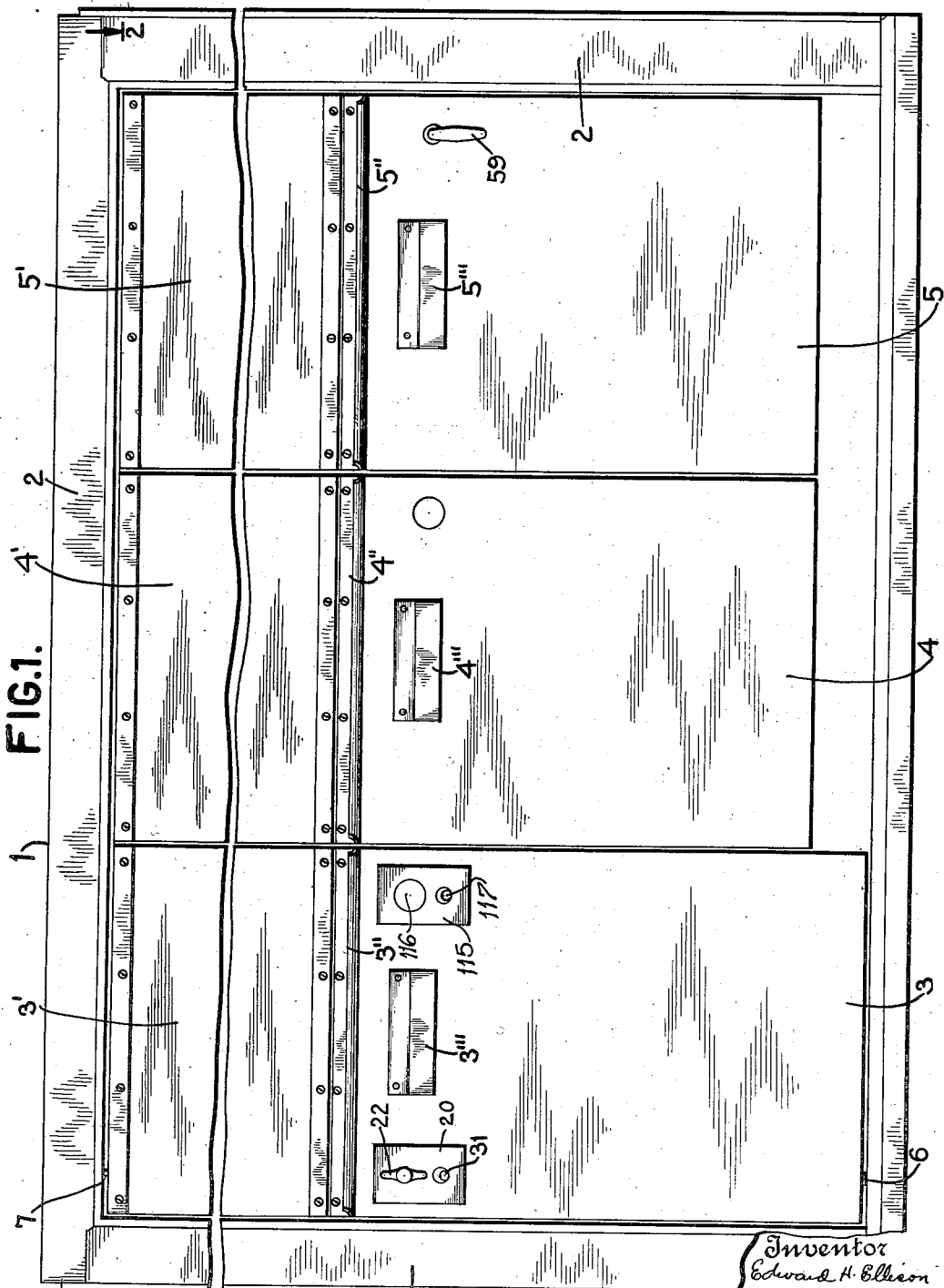

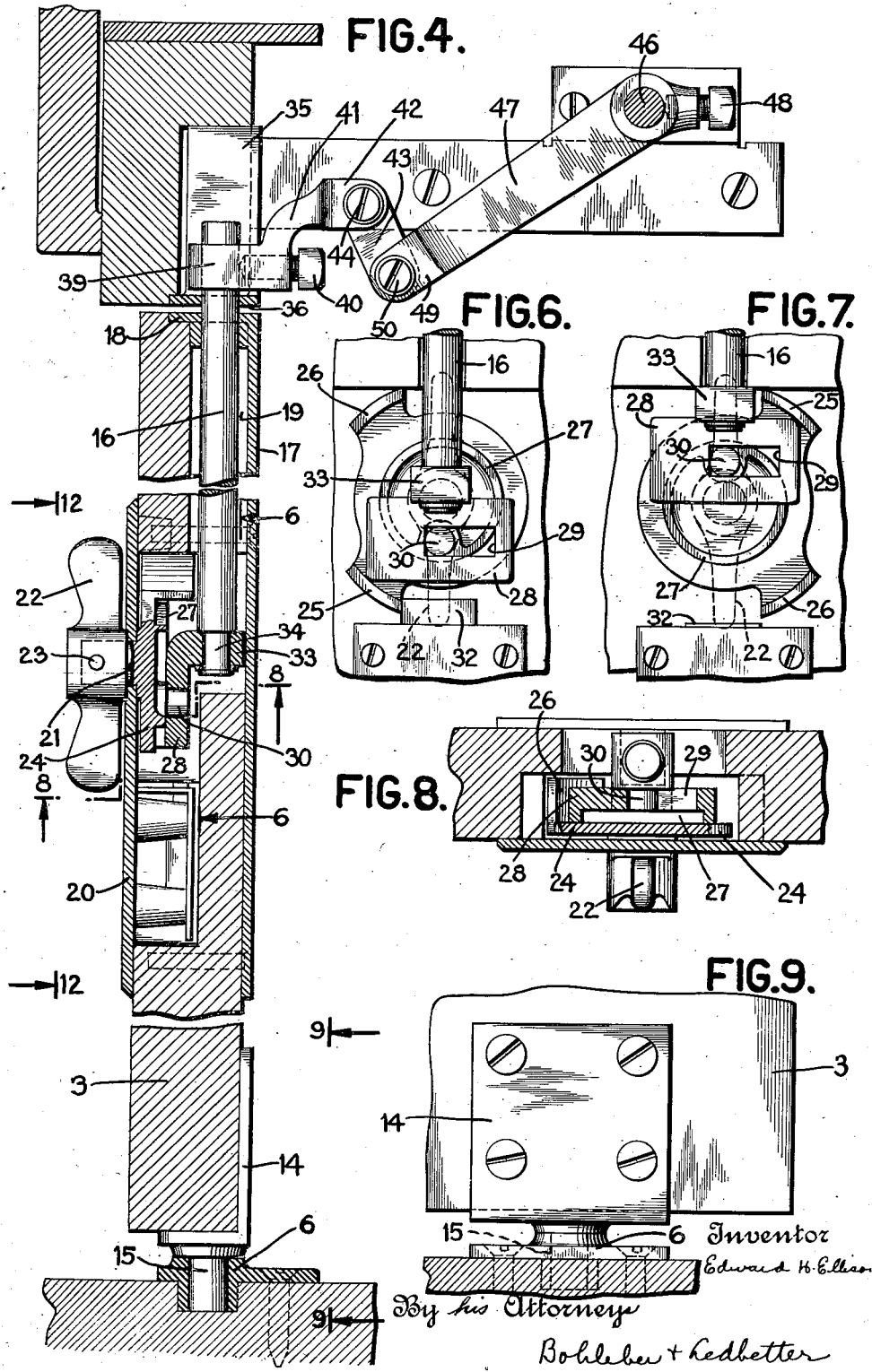

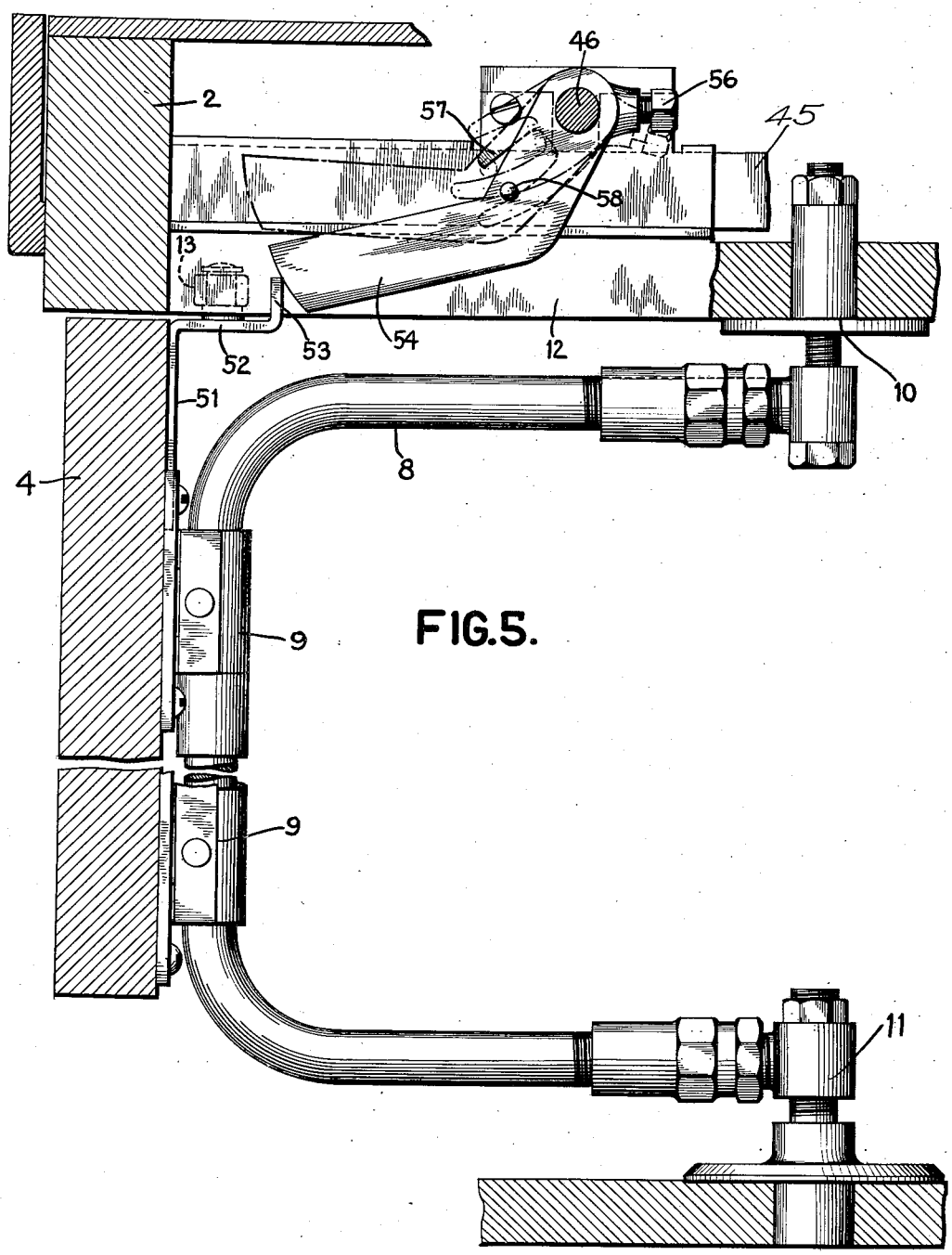

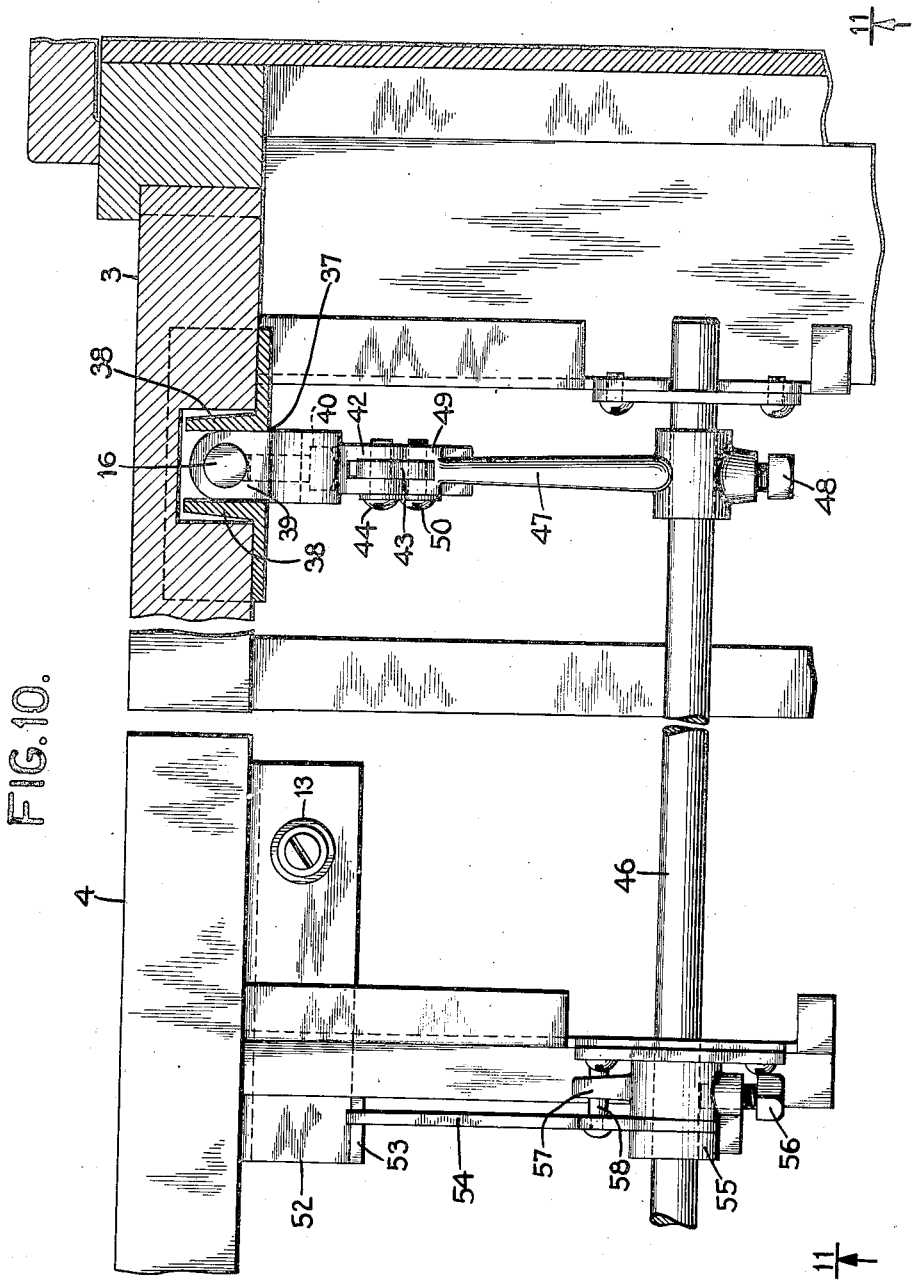

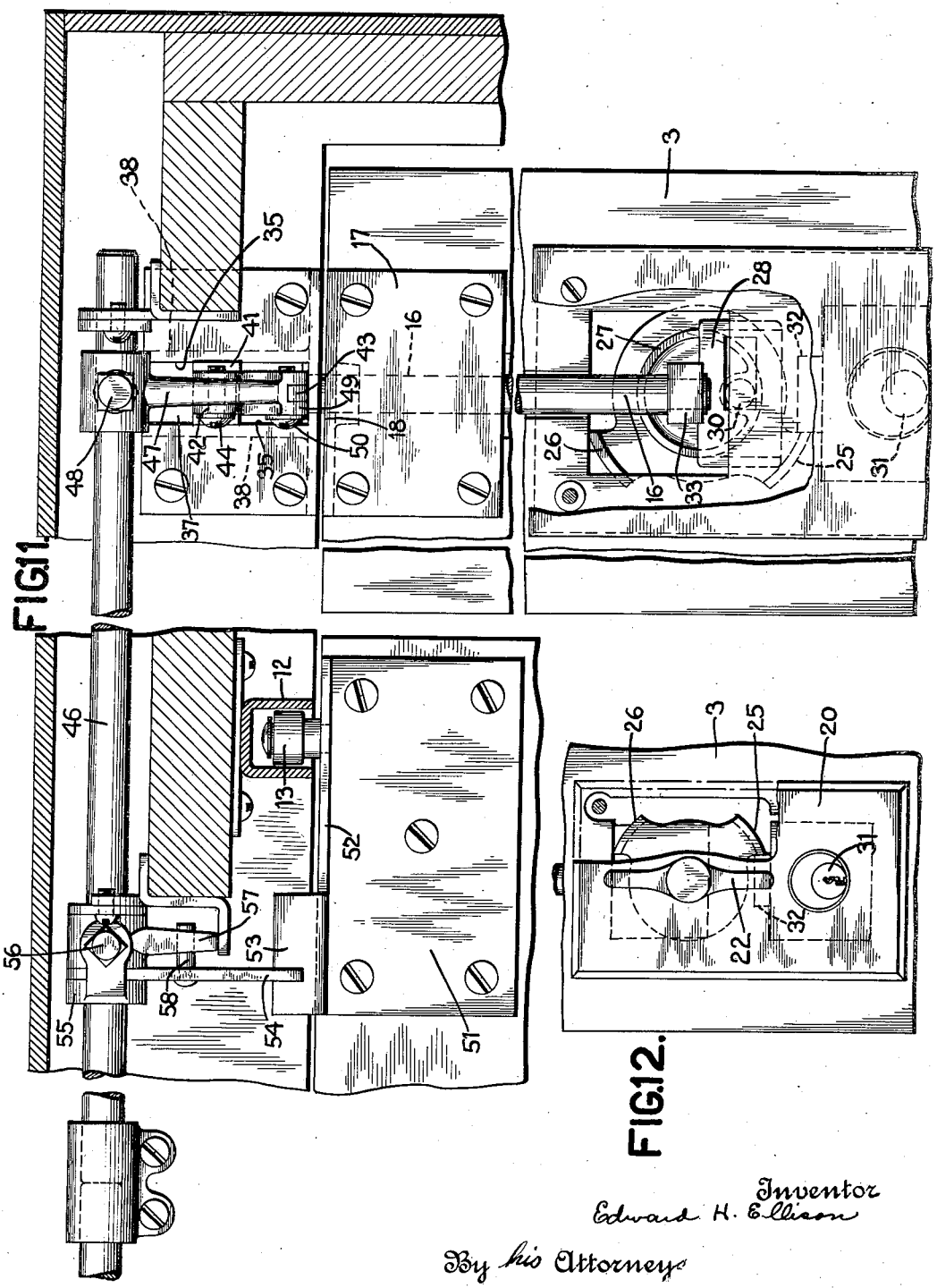

April 24, 1934.  E. H. ELLISON  1,956,277
SCHOOLROOM WARDROBE
Filed March 19, 1930  8 Sheets-Sheet 7
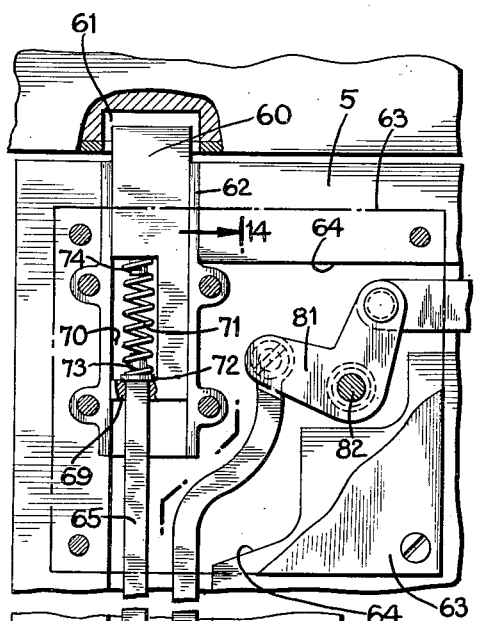
FIG.13.
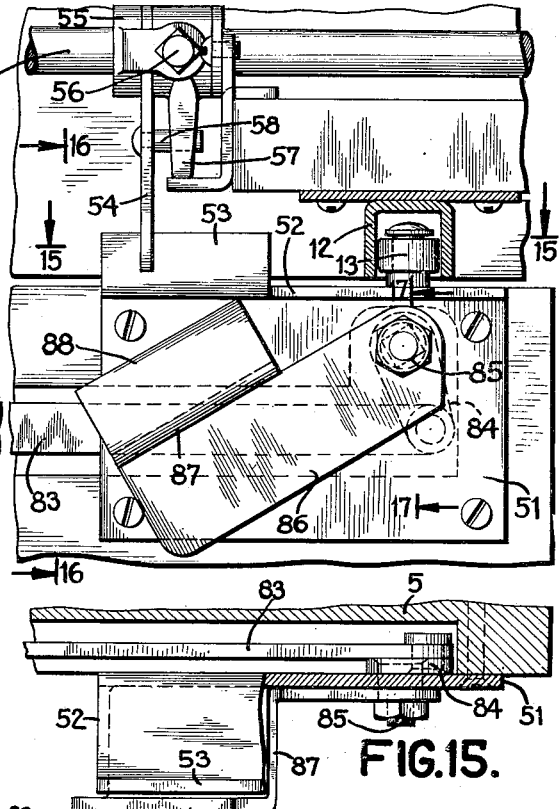
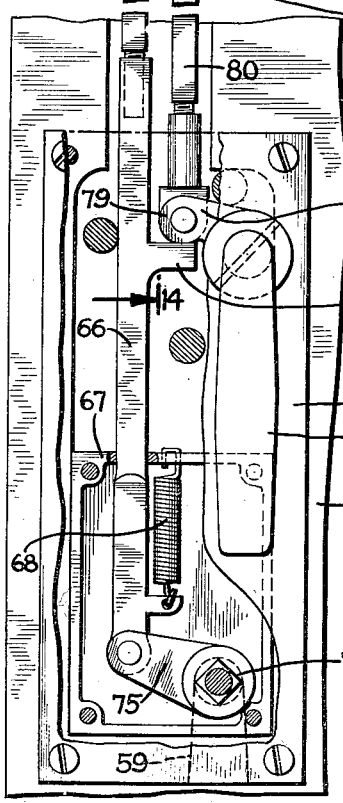
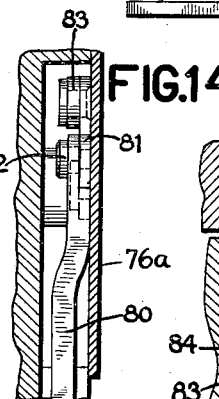
FIG.14.
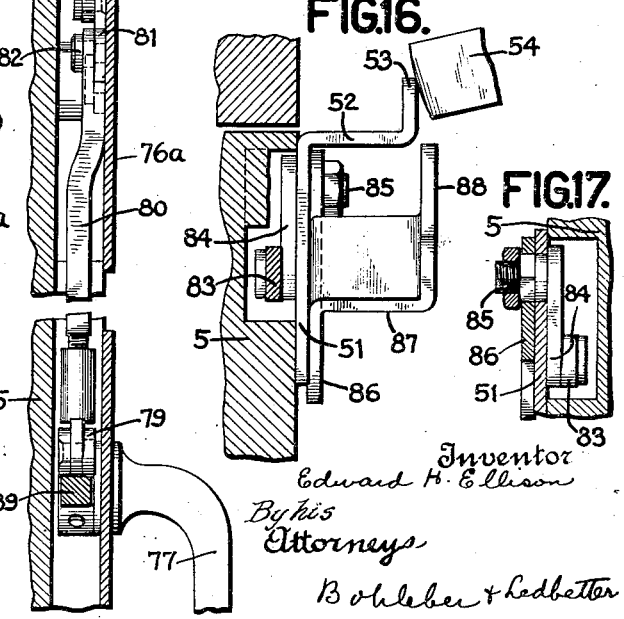
FIG.16.  FIG.17.
Inventor
Edward H. Ellison
By his
Attorneys
Bohleber & Ledbetter April 24, 1934.                 E. H. ELLISON                1,956,277
                            SCHOOLROOM WARDROBE
                           Filed March 19, 1930        8 Sheets-Sheet 8
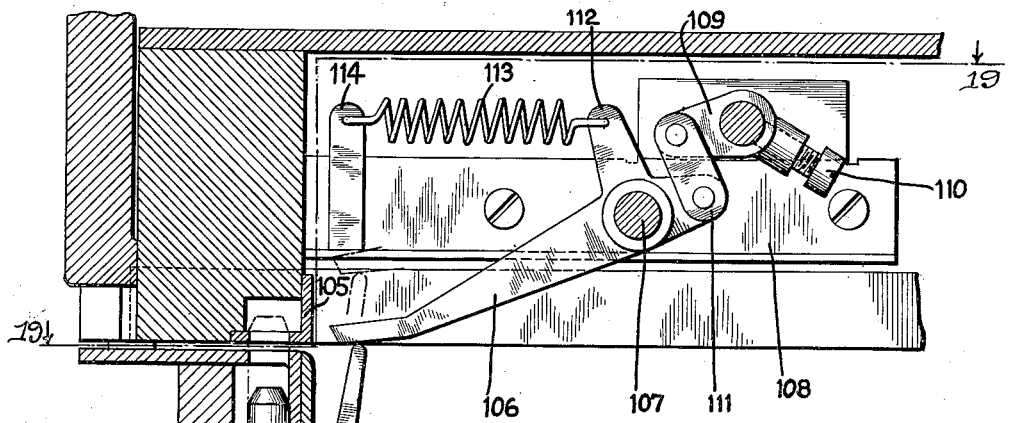
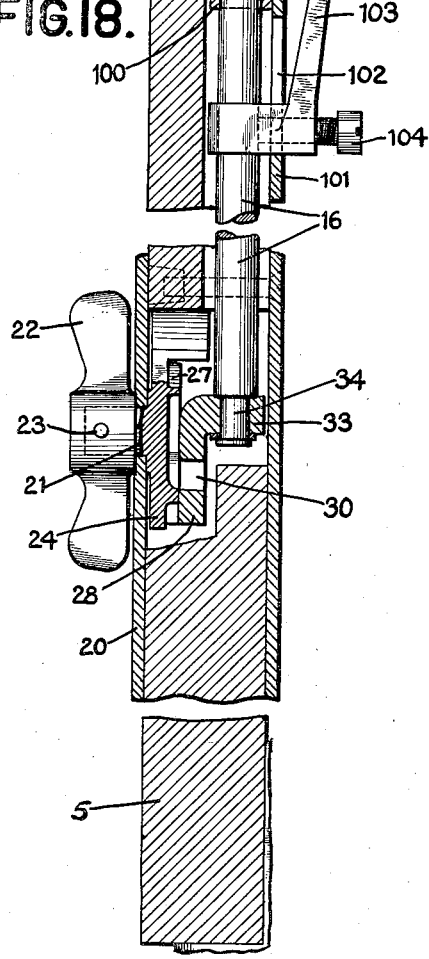
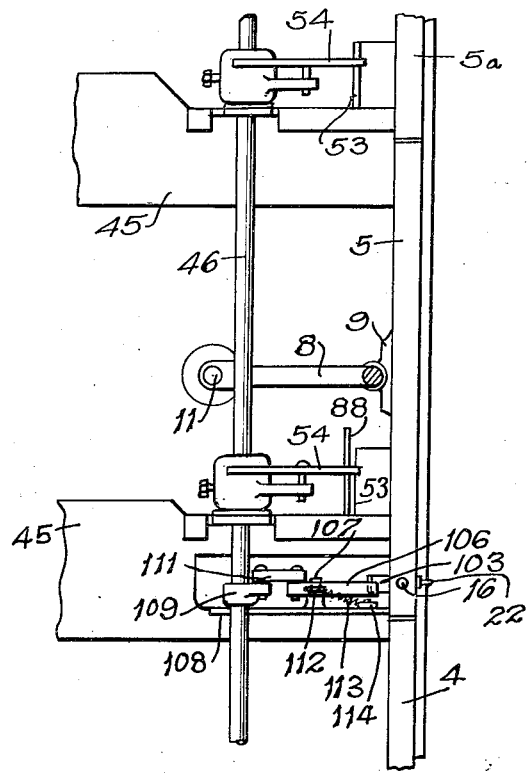
FIG.18.    FIG.19.
Inventor
Edward H. Ellison
By his Attorneys
Bohleber + Ledbetter Patented Apr. 24, 1934

1,956,277

UNITED STATES PATENT OFFICE 1,956,277

SCHOOLROOM WARDROBE

Edward H. Ellison, Jamestown, N. Y., assignor, by mesne assignments, to Austral Window Company, New York, N. Y., a corporation of Maine Application March 19, 1930, Serial No. 436,928

65 Claims. (Cl. 312—193)

The present invention relates to wardrobes adapted for use in school rooms, etc., wherein provision is made either to use the wardrobe doors as blackboard supports or other suitable paneling serving additional purposes. More specifically, the invention embodies an improved wardrobe, whereof the doors, of which a plurality are provided for each wardrobe, are controlled in such manner that they may be more effectively closed and locked.

With a view to improving on existing wardrobe constructions embodying a plurality of independently mounted doors, the invention further seeks to provide, in addition to an effective locking means for all the doors, a mechanism which will permit the independent functioning of each door to the exclusion of others, as well as a safety mechanism which may be operated from within the wardrobe to enable the doors to be unlocked.

Wardrobes have been constructed in which a plurality of doors are provided to serve as the closure members thereof as well as blackboard supports. It has furthermore been proposed to interlock the door operating and supporting mechanism in such manner that all of the doors are opened and closed simultaneously. While it is sometimes desirable to operate all of the doors simultaneously, it frequently is necessary only to operate a single door or perhaps two. In addition to the objection to opening or closing all of the doors under these circumstances, the added power required to effect the operation of all of the doors simultaneously renders the combined operation highly inconvenient. A further objection resides in the fact that the construction of an interlocking mechanism of the above character involves a comparatively complicated structure having the disadvantage of requiring constant attention to service properly as well as easily becoming inoperative due to jamming etc. The power necessary to operate a number of doors of such great weight requires the use of comparatively heavy mechanism which is consequently inconvenient to manipulate.

As distinguished from the foregoing, the present invention contemplates the use of independent door supporting and operating mechanism, while as a convenience in controlling such operation, the locking means of each door is controlled by a master, or general lock. Although this master lock may be mounted on any of the doors, it is preferred to mount it upon an end door which may be pivotally mounted, thus making for simplicity of design, as well as convenient and effective operation.

As previously noted, the invention provides a safety mechanism by means of which certain of the locks of the doors may be released or rendered ineffective, thus affording a safety device serving as a precaution against causing the doors to be closed and locked while someone is in the wardrobe.

An object of the invention, accordingly, is to provide a wardrobe having a plurality of doors and a convenient locking means therefor.

A further object is to provide a wardrobe of the above character with a locking means controlled by a single control device.

A further object is to provide a control device of the above character by means of which each door may be individually closed and locked at the same time being under the supervision of a master, or general locking device.

Yet another object of the invention is to provide a device of the above character wherein the control elements are conveniently disposed and incorporated within the door supporting and operating mechanism.

A further object is to provide a device of the above character, the elements of which are similar in construction and effective in operation.

Another object of the invention is to provide a safety means for preventing the accidental locking of a person in a wardrobe of the above character.

A further object of the invention is to provide a safety device of the above character, wherein the locking means is rendered ineffective by means disposed within the closet.

Further objects, not specifically enumerated above, will be apparent as the invention is described in greater detail in connection with the accompanying drawings wherein:

Figure 1 is a view in front elevation, showing a wardrobe and teacher's closet provided with doors constructed in accordance with the present invention.

Figure 2 is a view in section, taken on line 2—2 of Figure 1, and looking in the direction of the arrows.

Figure 3 is a view in section, looking at the rear of the structure shown in Figure 1.

Figure 4 is a view in section, taken on line 4—4 of Figure 3, and looking in the direction of the arrows.

Figure 5 is a view in section, taken transversely through the wardrobe and a door thereof, and showing the mounting and locking means for one of the doors.

Figure 6 is a view in section, taken on line

6—6 of Figure 4, and looking in the direction of the arrows, this view showing the manual operated locking means of the present invention.

Figure 7 is a view similar to Figure 6, showing the lock operating means moved to another position.

Figure 8 is a view in section, taken on line 8—8 of Figure 4, and looking in the direction of the arrows.

Figure 9 is a view in section, taken on line 9—9 of Figure 4, and looking in the direction of the arrows.

Figure 10 is a view in section, taken on line 10—10 of Figure 3, and looking in the direction of the arrows.

Figure 11 is a view in section, taken on line 11—11 of Figure 10, and looking in the direction of the arrows.

Figure 12 is a segmental view in front elevation, taken on line 12—12 of Figure 4 and showing the lock operating mechanism locked in one of its positions.

Figure 13 is a view of the structure shown at the left hand corner of Figure 3, having the covers removed to reveal the mechanism therebehind.

Figure 14 is a view in section, taken on line 14—14 of Figure 13, and looking in the direction of the arrows.

Figure 15 is a view in section, taken on line 15—15 of Figure 13, and looking in the direction of the arrows.

Figure 16 is a view in section, taken on line 16—16 of Figure 13, and looking in the direction of the arrows.

Figure 17 is a view in section, taken on line 17—17 of Figure 13, and looking in the direction of the arrows.

Figure 18 is a view similar to Figure 4, but showing a modified form of operating mechanism, adapted for use on a sliding wardrobe door instead of the pivoted teacher's door.

Figure 19 is a fragmental plan view taken on line 19—19 of Figure 18 and looking in the direction of the arrows.

Referring to the above drawings, 1 designates a wardrobe and teacher's closet having a frame 2, a teacher's door 3, and wardrobe doors 4 and 5. Where a wardrobe and juxtaposed teacher's closet are designed for use in schools, etc. the doors are preferably provided with blackboard panels 3', 4', and 5', respectively, chalk ledges 3'', 4'', and 5'' being provided below the blackboard panels. Eraser pockets 3''', 4''', and 5''' are conveniently located upon the doors below the panels and manually operating means, described hereinafter, serves to control the operation of the wardrobe doors in a desired fashion.

In the form shown, the closet door 3 is pivoted upon a fixed vertical axis at 6 and 7, see Figure 1, while the wardrobe doors 4 and 5 are preferably mounted for swinging and sliding movement by means of pivot arms 8, Figure 5, which are journaled upon brackets 9 carried by the respective wardrobe doors and pivoted in upper and lower pivot bearings 10 and 11, respectively. The bearings are so constructed as to afford an adjustable mounting for the doors, thus enabling them to be elevated to provide the desired clearance above the door jamb. The sliding movement of the doors 4 and 5 is guided by means of tracks 12 in which rollers 13, carried by the respective doors engage. The tracks 12 may be mounted on the wardrobe ceiling in any suitable manner or on stringers 45 such as shown in Figures 2, 3 and 5.

The closet door 3 is pivoted in a step bearing 6 mounted in the floor of the closet, an L-shaped bracket 14, Figure 4, being secured to the door and formed with a pivot pin 15 for engaging the bearing 6. Within the upper portion of door 3, a pivot rod 16 is slidably mounted, in a rear cover plate 17 being formed with a turned-over flange 18 for receiving the rod 16 and permitting axial movement thereof. The cover plate 17 serves as a closure for the cavity 19 within the closet door 3, this cavity receiving the lock operating mechanism for the wardrobe doors 4 and 5, to be described hereinafter. Front cover plate 20 serves as the front closure for the cavity 19 and the above mechanism.

Mounted in the front cover plate is a pin 21 upon which a manually operable handle 22 is secured by means of a dowel 23. Pin 21 is formed upon a disc 24 carried upon the rear side of plate 20 and formed with locking dogs 25 and 26. A cylindrical shoulder 27 is formed upon the rear face of the disc 24 and serves to space a plate or bracket 28 from the disc. This bracket is formed with a slot 29 within which a pin 30, formed on the disc 24, engages, the pin being slidable freely in the slot 29.

Below the handle 22, a lock 31 is mounted, this lock having a lock bar 32 and being of usual construction in order that it may be manipulated by a key. Lock bar 32 is adapted to engage either dog 25 or dog 26, depending upon the position to which the handle 22 has been turned, Figure 6 illustrating the lock bar as engaging a dog 25, while Figure 7 illustrates the position of the handle 22 when the lock bar is adapted to engage the dog 26.

Referring again to the plate or bracket 28, this element is formed with a turned-over arm 33 provided with a bearing within which an extension 34 formed on rod 16 and of a reduced diameter is rotatably received. Movement of pin 30, in accordance with the manipulation of handle 22 is thus transmitted to the rod 16 to effect axial movement thereof.

Within the upper portion of the closet and in the frame thereof is mounted an upper bearing support 35 formed with horizontal and vertical faces, the horizontal face having a bearing 36 for journalling the pin 16. The vertical face of bearing bracket 35 is formed with a slot 37, see Figure 10, from the edges of which parallel flanges 38 extend. These flanges lie above the horizontal face of the bearing member and form guide plates for receiving a collar 39 which is secured to the rod 16 by means of a set screw 40. When the door has been properly positioned, the collar 39 is secured to the rod 16 at the proper position to actuate the locking means described hereinafter. An arm 41 is formed on the collar and provided with spaced pivot arms 42 between which a link 43 is secured by pivot pin 44. Journaled within the wardrobe upon suitable brackets is a rock shaft 46 which carries an arm 47 secured to the shaft by means of a set screw 48. The outer end of arm 47 is formed with a bifurcated extension 49 between which an end of the link 43 is pivoted by means of pin 50. The foregoing mechanism thus transmits the axial movement of rod 16 to the rock shaft 46 to effect the movement thereof.

Each wardrobe door has secured to the upper portion thereof a lock plate 51, Figure 5, upon which a rearwardly extending arm 52 is formed having an upwardly extending flange 53. Locking dogs 54 are journaled upon rock shaft 46 and suitably spaced by means of collars 55 which are secured to the shaft by set screws 56. These collars 55 are formed with fork-shaped arms 57, pins 58 being mounted upon the respective dogs 54 and extending between the arms 57. By means of the foregoing construction, a degree of lost motion between the dogs 54 and rock shaft 46 is provided. Thus any wardrobe door may be closed and locked by its respective dog without moving the rock shaft to disturb other wardrobe doors which may have previously been locked. Upon upward movement of rod 16, the rock shaft 46 will be moved to lift the dogs 54 out of the path of flanges 53 to unlock the doors and permit the same to be opened.

In order that precaution may be provided to prevent the accidental locking of the wardrobe doors when someone is in the wardrobe, and enable the person so confined to release the locking mechanism, a safety device is provided upon one of the doors. In the form shown, the safety device is carried upon an end wardrobe door distant from the pivoted closet door 3 and shown as door 5. Door 5 is provided with a handle 59 upon the front face thereof to actuate a latch 60, see Figures 3 and 13, which engages a recess 61 in the top frame of the wardrobe. This latch is preferably mounted slidably in a keeper 62 which is mounted in the upper portion of door 5 by a cover plate 63. A recess 64 is formed in the door 5 within which the latch operating and releasing mechanism is received, a rod 65 being provided with an extension 66 which is slidably mounted in a frame 67. A spring 68 normally urges the rods 66 and 65 upwardly to cause the latch 60 to be normally in engaging position. The upper extremity of rod 65 is slidably received within a bearing 69 formed in the latch, and a recess 70 in the latch 60 carries a spring 71 which is seated upon a collar 72 formed upon the end of rod 65. Spring seats 73 and 74, formed on the rod 65 and latch 60, respectively, position the spring 71 properly and permit relative movement between the rod 65 and latch 60 in order that the depression of the latch 60 by the latch plate will not be transmitted to the handle 59.

An arm 75 is pivoted to the lower end of the extension 66 and is mounted upon a squared shaft 76 upon which the handle 59 is mounted. By means of the above construction, movement of handle 59 effects the disengagement of latch 60 and permits the door 5 to be opened.

Upon the rear side of door 5, a plate 76a is mounted. This plate carries a manually operable handle 77 formed with an arm 78. The arm is provided with a bifurcated extremity 79 between the spaced portions of which an end of link 80 is pivoted. This link is pivoted to an arm of a bell crank lever 81 which is journaled within the recess 64 at 82, the other arm of the lever 81 being pivoted to a link 83. The other extremity of link 83 is pivoted to an arm 84 which is carried by a squared shaft 85 mounted in the plate 51 which is mounted upon door 5. An arm 86 is secured to the squared shaft 85 and is formed with an offset extension 87 upon which an upwardly extending flange 88 is formed. This flange is adapted to extend in close proximity to and parallel with the flange 53 formed on the plate 51. Upon the extension 66, a shoulder or projecting lug 89 is formed, the bifurcated extremity of arm 78 resting upon such shoulder.

From the foregoing, it will be seen that movement of handle 77 in a counterclockwise direction, as viewed in Figure 13, will move the plate 86 in a clockwise direction, as viewed in the same figure. This will throw flange 88 upwardly against the pivoted locking dog 54 and cause its disengagement from the flange 53. Simultaneously with such actuation, the arm 78 will engage the shoulder 89 and cause the rod 65 to be moved downwardly, thus withdrawing the latch 60 from the recess 61 and releasing the door for movement to an open position. It will thus be seen that the door 5 may be unlocked and opened from the inside, thus preventing the accidental locking of persons within the wardrobe.

In the form of the invention shown in Figures 18 and 19, the general lock operating mechanism is shown as mounted in one of the wardrobe doors, instead of in the teacher's closet door as just described; this construction being of particular utility where the door casements are too narrow to receive the mechanism and there is not provided a pivoted or teacher's closet door. Referring to this form of general lock operating mechanism, it will be seen that our device is adapted to control the locking mechanism for the door upon which it is mounted as well as all the other doors of the wardrobe. This mechanism includes the manually operated member 22 and rod 16, as well as the locking mechanism and associated parts, see Figure 18. Figure 19 shows the door 5, as shown in Figure 2, and a door 5a, each of which is provided with locking means such as has been described above. It will be understood that door 4, a part of which is also shown in Figure 19, is also provided with similar locking means.

Instead of extending normally above the top of the door, the rod 16, shown in Figure 18, terminates below the top thereof and is slidably mounted in an inwardly extending flange 100 mounted with a plate 101 which may be similar to plate 51. Plate 101 is formed with a slot 102 within which the shank of a dog 103 is slidably received. Set screw 104 is provided for securing the shank to rod 16 and vertical movement of rod 16 is thus transmitted to the dog 103.

Immediately above rod 16 in the casing of the door, a lock plate 105 is provided, upward movement of rod 16 causing the end thereof to engage the plate and lock the door, as indicated in dot and dash lines in Figure 18. This upward locking movement is transmitted to rock shaft 46 through a lever 106 which may be pivoted at 107 in a plate 108 in which shaft 46 may be mounted. One end of lever 106 is connected to a crank arm 109 which is secured to shaft 46 by means of a set screw 110 through a link 111 pivotally connected to the ends thereof. An arm 112 on lever 106 serves as a connection for spring 113, the other end of which may be connected to an arm 114 on plate 108.

It will thus be seen that upward movement of rod 16 will cause the locking dogs 54 to be moved downwardly to lock the respective doors in their closed positions, rod 16 also serving as an additional lock for door 5. Spring 113 will return the shaft 46 and dogs 54 to their unlocked positions upon movement of rod 16 downwardly to unlock door 5 and disengage dog 103 from lever 106.

While the locking and safety mechanism have been shown as carried by either the teacher's closet door or a wardrobe door, it will be apparent that the invention may be embodied in structures, wherein such mechanism may be carried either upon the stationary portion of the wardrobe or may be embodied upon any of the other wardrobe doors. By the specific construction shown, the pivot support for the teacher's closet door serves the additional function of a lock operating device and thus affords a simple and convenient mechanism. Should it be desired to mount the operating mechanism in the stationary casing 2, it would only be necessary to provide the necessary recessed portions therein to receive the mechanism described hereinbefore, in such case the mechanism being relieved of the additional function of pivoting the closet door. The doors, while being released simultaneously by such mechanism, can be closed individually even though the general or master lock 31 is locked. Upon releasing of this master lock, the master releasing mechanism is actuated by the handle 22 to release all of the doors of the wardrobe.

The pivoted or teacher's closet door 3 is provided with an escutcheon 115, door knob 116 and lock 117 of any well known type such that said door may be locked, latched, opened or otherwise manipulated as in the case of an ordinary door. One of the advantages of mounting the master or general wardrobe lock 31 on the teacher's closet door is to place said lock in an accessible position so that the teacher may control the locks on a plurality of wardrobe doors from a position in front of the teacher's closet.

While the invention has been described with specific reference to the accompanying drawings, it is not to be limited, save as defined in the appended claims.

I claim as my invention:

1. A wardrobe of the character described including a plurality of doors, locking means for said doors, and means carried by another door for releasing all of the locking means.

2. A wardrobe of the character described including a plurality of doors, means for mounting one of the doors pivotally, locking means for the other doors, and means carried by the pivotally mounted door for releasing all of the locking means of the other doors.

3. A wardrobe of the character described including a plurality of doors, individual locking means for each of said doors, and means operatively connected to another door for releasing all of the locking means simultaneously.

4. A wardrobe of the character described including a plurality of doors, means movably mounting one of the doors for movement to and from an open or closed position, locking means for the remaining doors, and means actuated by the mounting means for operating the locking means.

5. A wardrobe of the character described including a plurality of doors, means mounting one of the doors for movement to and from an open or closed position, locking means for the remaining doors, and means including the mounting means for operating the locking means.

6. A wardrobe of the character described including a plurality of doors, means mounting one of the doors pivotally, locking means for the remaining doors, and means including the mounting means for operating the locking means.

7. A wardrobe of the character described including a plurality of doors, means mounting one of the doors pivotally, locking means for the remaining doors, and means actuated by the mounting means for operating the locking means.

8. A wardrobe of the character described including a plurality of doors, means mounting one of the doors pivotally, said means being movable in the axis of its pivot, locking means for the remaining doors, and means actuated by the axial movement of the mounting means for operating the locking means.

9. A wardrobe of the character described including a plurality of doors, a pivot rod mounting one of the doors for swinging movement, means mounting the rod for axial movement, locking means for the remaining doors, and means actuated by the axial movement of the rod for operating the locking means.

10. A wardrobe of the character described including a door, means movably mounting the door, locking means for the door, a shaft, means whereby said shaft is attached to the wardrobe for operating the locking means, and means on another door for actuating the shaft.

11. A wardrobe of the character described including a plurality of doors, means movably mounting one of the doors, locking means for the remaining doors including a shaft, means whereby said shaft is attached to the wardrobe for operating the locking means, and means including the mounting means for actuating the shaft.

12. A wardrobe of the character described including a plurality of doors, a pivot rod mounting one of the doors for swinging movement, means mounting the rod for axial movement, locking means for the remaining doors, a shaft mounted on the wardrobe for actuating the locking means, and means actuated by the axial movement of the pivot rod for operating the shaft.

13. A wardrobe of the character described including a plurality of doors, a pivot rod mounting one of the doors for swinging movement, means mounting the rod for axial movement, pivoted dogs for locking the remaining doors, a shaft mounted on the wardrobe carrying the dogs, and means operated by the axial movement of the rod for rocking the shaft.

14. A wardrobe of the character described including a plurality of doors, a pivot rod mounting one of the doors for swinging movement, means mounting the rod for axial movement, a rock shaft on the wardrobe and dogs journaled on the shaft for locking the remaining doors, and means operated by the axial movement of the rod for rocking the shaft.

15. A wardrobe of the character described including a plurality of doors, a pivot rod mounting one of the doors for swinging movement, means mounting the rod for axial movement, locking means for the remaining doors, said locking means comprising a rock shaft on the wardrobe and locking dogs mounted on said shaft, a lost motion connection between said dogs and shaft, and means operated by the axial movement of the rod for rocking the shaft.

16. A wardrobe of the character described comprising a door, means mounting the door for swinging movement, a locking device for the door, a rock shaft for operating the locking devices, means for mounting said shaft on the wardrobe, and means on another door for actuating the shaft.

17. A wardrobe of the character described comprising a door, means mounting the door for swinging movement, a rock shaft mounted on the wardrobe, means on another door for actuating the shaft, and a dog journaled on the shaft for locking the first mentioned door.

18. A wardrobe of the character described comprising a door, means mounting the door for swinging movement, a rock shaft mounted on the wardrobe, means on the door for actuating the shaft, a locking dog, and a lost motion connection between the dog and shaft.

19. A wardrobe of the character described comprising a door, means mounting the door for swinging movement, a rock shaft mounted on the wardrobe, means on the door for actuating the shaft, a locking dog on the shaft, and a forked member connected to and movable with the shaft and engaging the dog with lost motion.

20. A wardrobe of the character described comprising a plurality of doors, means mounting one of the doors pivotally, individual locking means for each of the other doors, and means including the pivoting means for operating all of the locking means.

21. A wardrobe of the character described comprising a plurality of doors, means mounting one of the doors pivotally, individual locking means for each of the other doors, a rock shaft mounted on the wardrobe, means operating all of the locking means from the shaft, and means actuated by the pivoting means for operating the shaft.

22. A wardrobe of the character described comprising a plurality of doors, means mounting one of the doors pivotally, individual locking means for each of the other doors, a rock shaft mounted on the wardrobe, lost motion connections between the shaft and the respective locking means, and means actuated by the pivoting means for operating the shaft.

23. A wardrobe of the character described comprising a plurality of doors, means to mount one of the doors pivotally, an individual locking dog for each of the other doors, a rock shaft mounted upon the wardrobe and upon which the dogs are journaled, lost motion connections between the shaft and dogs, and means actuated by the pivoting means for operating the shaft.

24. A wardrobe of the character described comprising a plurality of doors, a pivot rod mounting one of the doors, means mounting the rod with capacity for axial movement, an individual locking dog for each of the other doors, a rock shaft mounted upon the wardrobe and upon which the dogs are journaled, lost motion connections between the shaft and dogs, and means to actuate the shaft by axial movement of the pivot rod.

25. A wardrobe of the character described comprising a plurality of doors, a pivot rod mounting one of the doors, means mounting the rod with capacity for axial movement, and individual locking dog for each of the other doors, a rock shaft mounted upon the wardrobe and upon which the dogs are journaled, forked members connected to and movable with the shaft to engage the dogs with lost motion, and means to actuate the shaft by axial movement of the pivot rod.

26. A wardrobe of the character described comprising a plurality of doors, a pivotal rod mounting one of the doors, means mounting the rod with capacity for axial movement, a lock plate carried by each of the other doors, an individual locking dog for each of said other doors engaging the respective lock plates, a rock shaft mounted upon the wardrobe and upon which the dogs are journaled, lost motion connections between the shaft and dogs, and means to actuate the shaft by axial movement of the pivot rod.

27. A wardrobe of the character described including a plurality of doors, means movably mounting one of the doors including a pivot rod supporting said door, means mounting the rod for axial movement, locking means for the other doors, means actuated by the rod for operating the locking means, and means carried by the pivoted door and rotatable on the rod far actuating the rod.

28. A wardrobe of the character described including a plurality of doors, means movably mounting one of the doors including a pivot rod supporting said door, means mounting the rod for axial movement, locking means for the other doors, means actuated by the rod for operating the locking means, a bracket journaled on the rod, and means on the pivoted door for actuating the bracket.

29. A wardrobe of the character described including a plurality of doors, means movably mounting one of the doors including a pivot rod supporting said door, means mounting the rod for axial movement, locking means for the other doors, a rock shaft actuating the locking means, an arm on the shaft, an arm on the rod connected to the first arm, and adjustable means securing the latter arm to the rod.

30. A wardrobe of the character described including a plurality of doors, means movably mounting one of the doors including a pivot rod supporting said door, means mounting the rod for axial movement, locking means for the other doors, a rock shaft actuating the rocking means, an arm on the shaft, a collar carried by the rod, means securing the collar adjustably to the rod, and an arm on the collar connected to the first arm.

31. A wardrobe of the character described including a plurality of doors, means movably mounting one of the doors including a pivot rod supporting the door, means mounting the rod for axial movement, locking means for the other doors, a rock shaft actuating the locking means, an arm on the shaft, an arm on the rod connected to the first arm, adjustable means including a collar for securing the latter arm to the rod, an upper bearing member on the frame of the wardrobe in which the rod is journaled, and means in the bearing member for receiving the collar with provision for axial movement.

32. An upper bearing member for a wardrobe door having an axially movable pivot rod comprising a plate carried by the wardrobe frame having a vertical face cut away, and spaced flanges adjacent the sides of the cut away portion upon opposite sides of the axis of the rod.

33. An upper bearing member for a wardrobe door having an axially movable pivot rod comprising a horizontal plate having a journal for the rod, a vertical plate formed with a slot, and spaced flanges extending over the horizontal plate from the sides of the slot, said flanges lying on opposite sides of the axis of the rod.

34. In a wardrobe door, an axially movable pivot rod, a manually operable member, a disc operatively connected to the manually operable member, means connecting the disc to the rod, and means to lock the disc.

35. In a wardrobe door, an axially movable pivot rod, a manually operable member, a disc operatively connected to the manually operable member, means connecting the disc to the rod, locking lugs on the disc, and a lock on the door operable to engage the lugs.

36. In a wardrobe door, an axially movable pivot rod, a manually operable member, a disc operatively connected to the manually operable member, means connecting the disc to the rod, and means to space the connecting means from the disc.

37. In a wardrobe door, an axially movable pivot rod, a manually operable member, a disc operatively connected to the manually operable member, means connecting the disc to the rod, and an annular shoulder on the disc to space the connecting means from the disc.

38. In a wardrobe door, an axially movable pivot rod, a manually operable member, a disc operatively connected to the manually operable member, a bracket connected to the rod and formed with a slot, and a pin on the disc engaging the slot.

39. In a wardrobe door, an axially movable pivot rod, a manually operable member, a disc operatively connected to the manually operable member, a bracket connected to the rod and formed with a slot, a pin on the disc engaging the slot, and an annular shoulder on the disc spacing the bracket from the disc.

40. In a wardrobe door, an axially movable pivot rod, a manually operable member, a disc operatively connected to the manually operable member, a bracket connected to the rod and formed with a slot, a pin on the disc engaging the slot, an annular shoulder on the disc spacing the bracket from the disc, and a locking lug on the disc.

41. In a wardrobe door, an axially movable pivot rod, a manually operable member, a disc operatively connected to the manually operable member, a bracket connected to the rod and formed with a slot, a pin on the disc engaging the slot, an annular shoulder on the disc spacing the bracket from the disc, and spaced locking lugs on the disc.

42. In a wardrobe door, an axially movable pivot rod, a manually operable member, a front closure plate mounting the member, a disc operatively connected to the manually operable member, means connecting the disc to the rod, a rear closure plate secured to the door, and a flanged portion on the rear plate slidably mounting the rod.

43. In a wardrobe door, an axially movable pivot rod, a manually operable member, a front closure plate mounting the member, a disc operatively connected to the manually operable member, means connecting the disc to the rod, a rear closure plate secured to the front plate, and a flanged portion on the rear plate flush with the top of the door and slidably mounting the rod.

44. A wardrobe of the character described comprising a plurality of doors, means mounting the doors for movement into an open or closed position, a locking device common to a plurality of said doors and including, a rock shaft on the wardrobe for operating the locking device, and means carried by one of the doors for actuating the shaft.

45. A device of the character described comprising wardrobe means having a plurality of wardrobe doors, means mounting the doors for movement to an open or a closed position, means for locking certain of the doors in a closed position, and actuating means mounted on the inside of one of said doors for releasing the locking means.

46. A device of the character described comprising a wardrobe, a plurality of wardrobe doors, means mounting said doors for movement to an open or a closed position, a pivoted locking dog for each door and mounted upon the wardrobe, and means having an operative mechanism mounted on another door, for disengaging all of the locking dogs.

47. A device of the character described comprising wardrobe means having a plurality of wardrobe doors, means mounting said doors for movement to an open or a closed position, a pivoted locking dog for each of said doors, common means for mounting said dogs, a lock plate on each door engageable by a dog, and means on another door for disengaging all the dogs and plates.

48. A device of the character described comprising wardrobe means having a plurality of wardrobe doors, means mounting the doors for movement to an open or a closed position, a pivoted locking dog for each door, means for mounting said dogs, a lock plate on each door engageable by a dog, means on one of the lock plates for disengaging the corresponding dog and plate, and manual means on the inside of one of the doors for operating the means on the lock plate.

49. A device of the character described comprising a wardrobe, a plurality of wardrobe doors, means mounting the doors for movement to an open or a closed position, a pivoted locking dog for each door, means for mounting said dogs, a lock plate on each door engageable by a dog, means on one of the lock plates for disengaging the dog and plate, and manual means on one of the doors for operating the means on the lock plate.

50. A device of the character described comprising a wardrobe, a plurality of wardrobe doors, means mounting the doors for movement to an open or closed position, a pivoted locking dog on the wardrobe for engaging each door, a lock plate on each door engageable by a dog, an arm pivoted on one of the doors and movable into engagement with the corresponding dog, and manual means on said door for operating the arm.

51. A device of the character described comprising a wardrobe, a plurality of wardrobe doors, means mounting the doors for movement to an open or closed position, a pivoted locking dog on the wardrobe for engaging each door, a lock plate on each door having a flanged extension engageable by the dog, an arm pivoted on one of the plates and having an extension similar to that of said plate and movable into engagement with the dog of said door when the door is locked, and manual means on the door for operating the arm.

52. A device of the character described comprising a wardrobe, a plurality of wardrobe doors, means mounting the doors for movement to an open or closed position, a pivoted locking dog on the wardrobe for engaging each door, a lock plate on each door engageable by a dog, an arm pivoted on one of the doors and movable into engagement with one of the dogs, a manually operated handle on the inside of the door, and means connecting the handle with the arm.

53. A device of the character described comprising a wardrobe, a plurality of wardrobe doors, means mounting the doors for movement to an open or closed position, a pivoted locking dog on the wardrobe for engaging each door, a latch carried by one of the doors for locking said door in a closed position, and means to disengage the latch on said door and simultaneously disengage the dog from said door.

54. A device of the character described comprising a wardrobe, a plurality of wardrobe doors, means mounting the doors for movement to an open or closed position, a pivoted locking dog on the wardrobe for engaging each door, a latch carried by one of the doors for locking said door in a closed position, manually operated means for disengaging the latch on said door, manual means for disengaging the dog, and a connection between the manual means and the manually operated means whereby the actuation of the manual means actuates the manually operated means.

55. A device of the character described comprising a wardrobe, a plurality of wardrobe doors, means mounting the doors for movement to an open or closed position, a pivoted locking dog on the wardrobe for engaging each door, a latch carried by one of the doors for locking said door in a closed position, manually operated means for disengaging the latch on said door, manual means for disengaging the dog engaging said door, a shoulder on the manually operated means, and an arm on the manual means engaging the shoulder to disengage the latch when the manual means disengages the dog.

56. A device of the character described comprising a wardrobe, a plurality of wardrobe doors, means mounting the doors for movement to an open or closed position, a pivoted locking dog on the wardrobe for engaging each door, a latch carried by one of the doors for locking the door in a closed position, a mounting plate on said door, manual means carried by the plate for disengaging the latch, manual means carried by the plate for disengaging the dog engaging said door, and means operated by the last named means to disengage the latch upon disengagement of the dog.

57. A wardrobe of the character described including a plurality of doors, locking means for each of the said doors, and means on another door for actuating all of the locking means.

58. A wardrobe of the character described including a plurality of doors, a rock shaft on the wardrobe, locking means actuated by the rock shaft, a vertically movable rod in a door, means engaged by the rod to lock the door, and means to actuate the rock shaft by the rod.

59. A wardrobe of the character described including a plurality of doors, a rock shaft on the wardrobe, locking means actuated by the rock shaft, a vertically movable rod in a door, an arm on the shaft, a lever, means between the lever and arm to transmit movement therebetween, and a dog on the rod to engage the lever.

60. A wardrobe of the character described including a plurality of doors, a rock shaft on the wardrobe, locking means actuated by the rock shaft, a vertically movable rod in a door, an arm on the shaft, a lever pivoted intermediate its ends, a link between the arm and one end of the lever, and a dog on the rod to engage the other end of the lever.

61. A wardrobe of the character described including a plurality of doors, a rock shaft on the wardrobe, locking means actuated by the rock shaft, a vertically movable rod in a door, an arm on the shaft, a lever pivoted intermediate its ends, a link between the arm and one end of the lever, a dog on the rod to engage the other end of the lever, and means to urge the lever normally in the direction of the dog.

62. A wardrobe of the character described including a plurality of doors, a rock shaft on the wardrobe, locking means actuated by the rock shaft, a vertically movable rod in a door, an arm on the shaft, a lever pivoted intermediate its ends, a link between the arm and one end of the lever, a dog on the rod to engage the other end of the lever, a plate on the door to receive the dog slidably, and means to urge the lever normally in the direction of the dog.

63. A wardrobe of the character described comprising a plurality of doors, means mounting the doors for movement into an open or closed position, means on the wardrobe for locking one or more of said doors, said locking means comprising a rod carried by one of the doors for actuating said locking means.

64. A wardrobe of the character described comprising a plurality of doors, means mounting the doors for movement into an open or closed position, a locking device common to a plurality of said doors and mounted on the wardrobe, and means comprising a vertically operable rod on one of the doors for actuating said locking device.

65. A wardrobe of the character described comprising a plurality of doors, means mounting the doors for movement into an open or a closed position, means on the wardrobe for locking one or more of said doors, said means comprising a rod carried by one of the doors adapted to lock or unlock said locking device whether or not one or more of said doors are in an open or a closed position, and means adapted to permit open doors to be closed and locked when said locking means is locked.

EDWARD H. ELLISON.